D. T. FISHER.
TROLLEY SUPPORTING MECHANISM.
APPLICATION FILED FEB. 10, 1909.
1,036,477.
Patented Aug. 20, 1912.
3 SHEETS—SHEET 1.
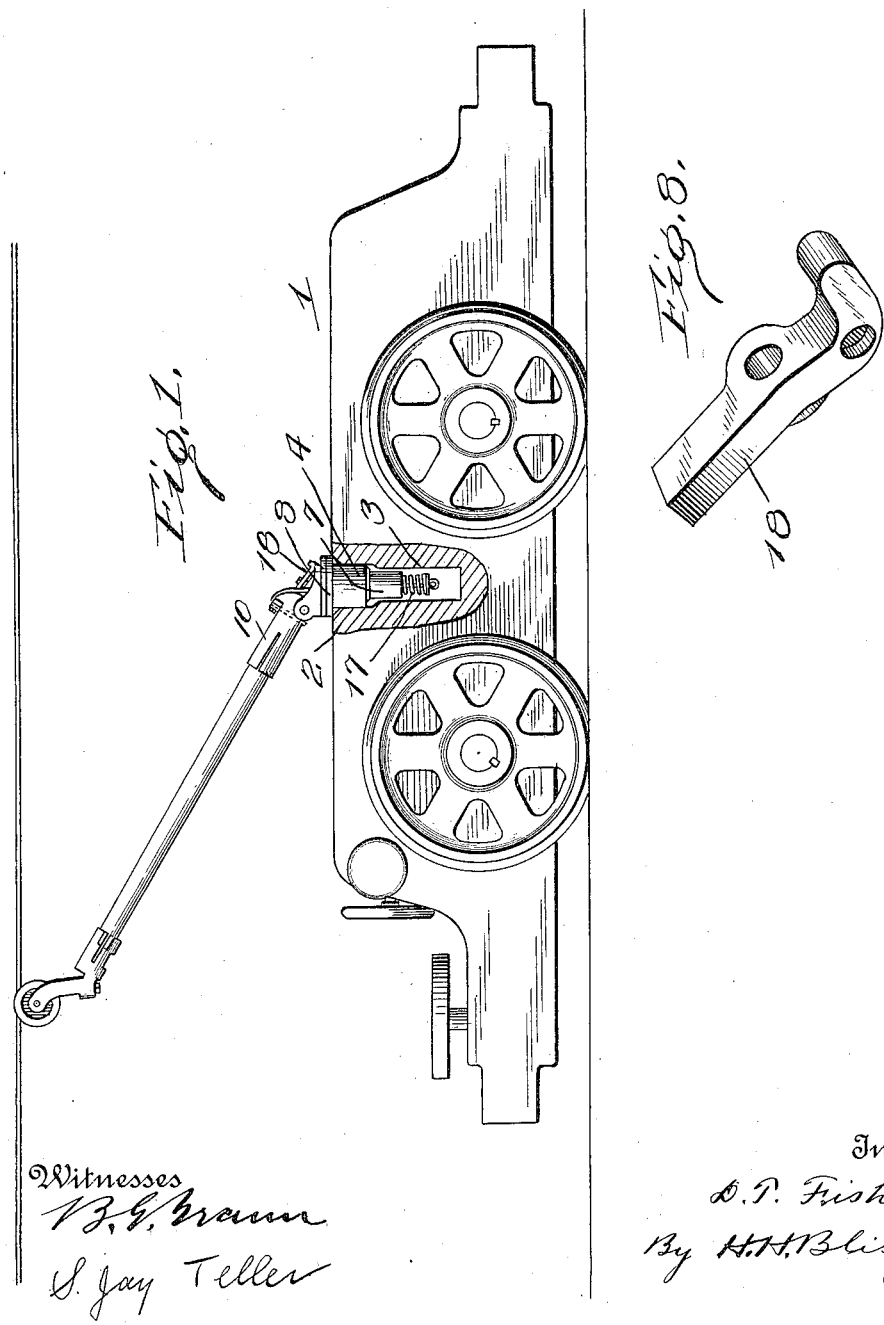
Witnesses
B. G. Braun
S. Jay Teller
Inventor
D. T. Fisher
By H. H. Bliss
Attorney

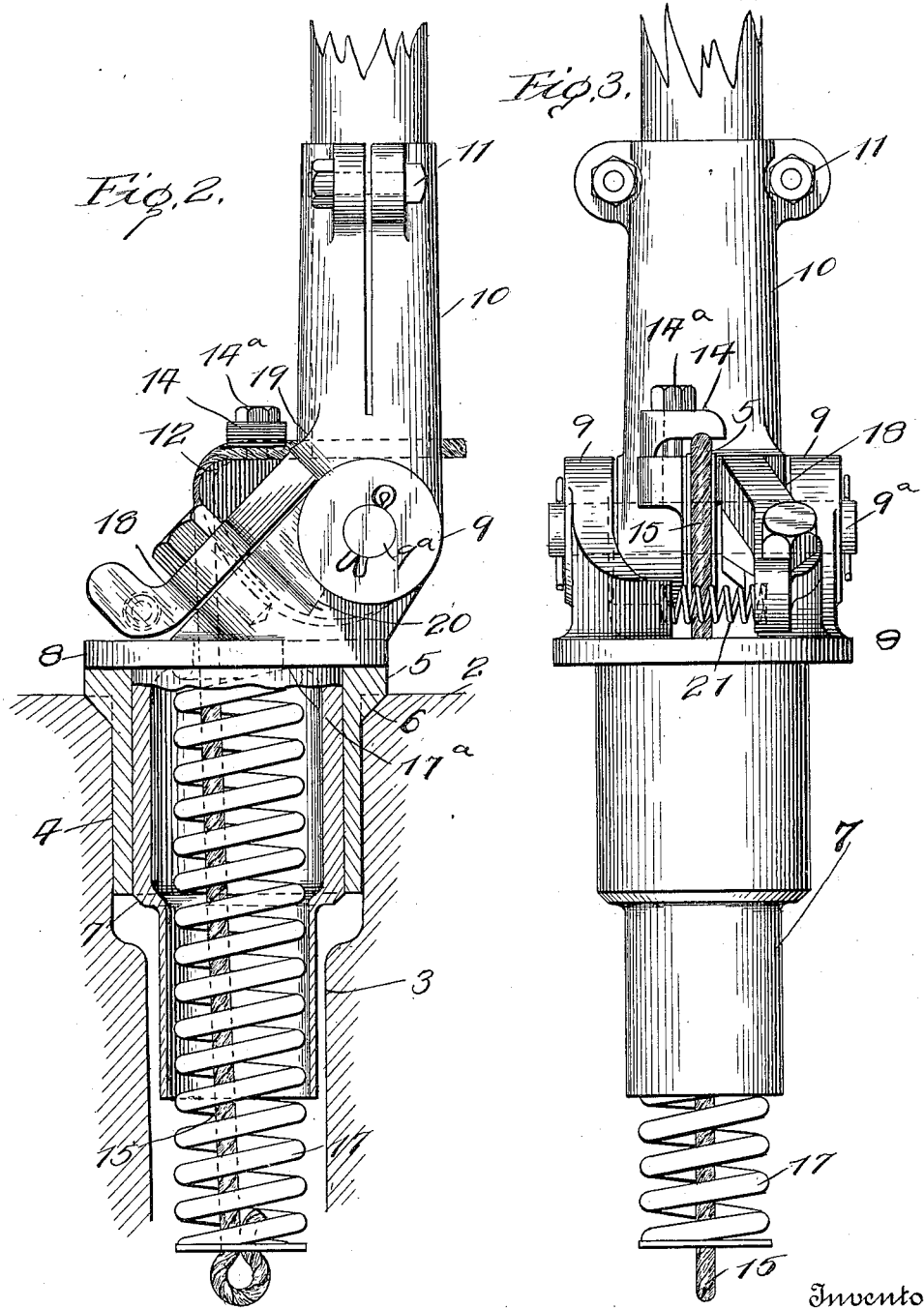

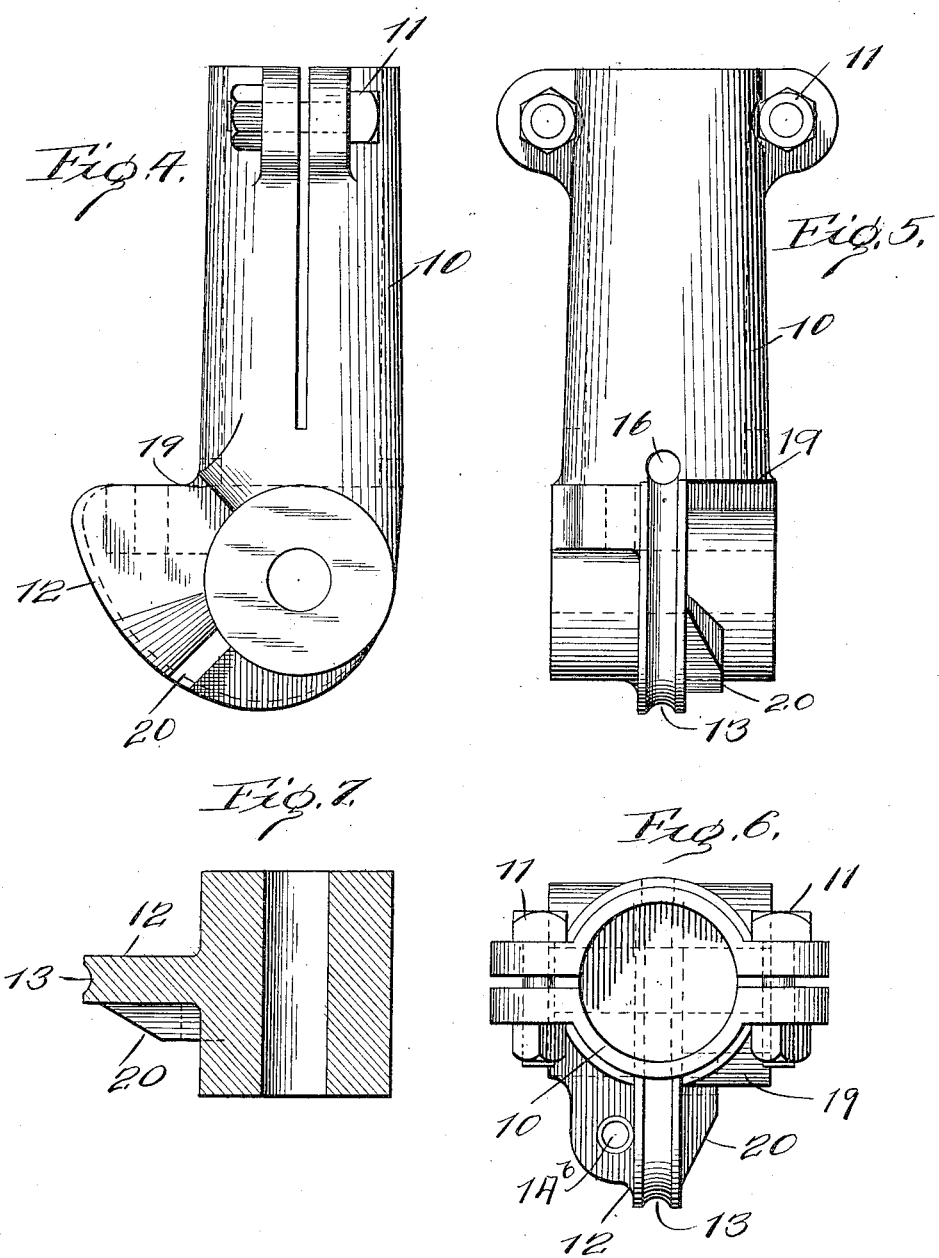

UNITED STATES PATENT OFFICE.

DUDLEY T. FISHER, OF COLUMBUS, OHIO, ASSIGNOR TO THE JEFFREY MANUFACTURING COMPANY, A CORPORATION OF OHIO.

TROLLEY-SUPPORTING MECHANISM.

1,036,477.      Specification of Letters Patent.    Patented Aug. 20, 1912.

Application filed February 10, 1909. Serial No. 477,213.

*To all whom it may concern:*

Be it known that I, DUDLEY T. FISHER, a citizen of the United States, residing at Columbus, in the county of Franklin and State of Ohio, have invented certain new and useful Improvements in Trolley-Supporting Mechanisms, of which the following is a specification, reference being had therein to the accompanying drawings.

This invention relates to improvements in trolley devices and trolley supporting apparatus adapted for use on electric cars and particularly on locomotives of the class used for haulage purposes in and about mines and similar places.

The object of the invention is to provide a trolley supporting device having improved structural features and having improved means for applying force to the trolley arm in a predetermined way.

In the drawings, Figure 1 is a side view of a locomotive having a trolley mechanism embodying my improvements. A part of the locomotive frame is broken away to show more clearly the trolley support. Fig. 2 is a side view showing the trolley support mounted in a section of the locomotive frame, a part being broken away to show more clearly the other parts. Fig. 3 is an end view of the trolley support with the outer bearing sleeve removed. Fig. 4 is a side elevation of the lower section of the trolley arm removed from the trolley support. Fig. 5 is an end elevation of the lower section of the trolley arm. Fig. 6 is a plan view of the lower section of the trolley arm. Fig. 7 is a cross sectional view through the pivotal axis of the lower section of the trolley arm. Fig. 8 is a perspective view of the pawl.

Referring to the drawings, 1 represents a mine locomotive having a frame 2, in the top of which is formed a vertical socket 3. 4 is a bearing sleeve which fits into the upper part of the socket 3 and has a supporting collar 5 and ribs 6 which prevent its turning in the socket. The trolley-supporting bushing or sleeve 7 is mounted in the sleeve 4 with a free working fit so that it may readily rotate therein. At its upper end this inner sleeve has an outwardly projecting flange 8 which bears against the collar 5. The supporting bosses 9 are mounted upon the flange 8 and carry a horizontal pin 9ª upon which the lower section 10 of the trolley arm is mounted. The trolley arm section 10 is tubular in form at its upper part and is adapted to receive the trolley arm proper. It is split at opposite sides and the bolts 11 serve to clamp it firmly around the trolley arm. The trolley arm section 10 has a lug 12 which has a groove 13 in its periphery.

14 is a clamp located at the upper part of the lug 12 and is adapted to engage a cable 15. The clamp is held in place by the bolt 14ª which enters the tapped hole 14ᵇ. Holes 16 are provided in the trolley arm section 10 through which the upper end of the cable may pass. The clamp 14 is so situated in relation to the groove 13 that the cable will wrap upon the grooved surface as the position of the trolley arm is changed.

17 is a coil spring bearing at its upper end on the inward projecting flange 17ª formed on the upper part of the sleeve 7. The cable 15 passes downward through the coil spring and is attached to it at its lower end so that the spring is compressed and the expansive force of the spring is transmitted to the trolley arm and tends to throw it into its upper or operative position.

18 is a pawl pivotally mounted upon one of the bosses 9.

19 is a stop formed upon the trolley arm and is so positioned that it will be engaged by the pawl and the motion of the trolley arm thus limited. 20 is a second stop formed upon the lower part of the trolley arm and is so positioned that it will be engaged by the pawl when the trolley arm is brought into its lower position. A spring 21 is provided which normally holds the pawl in position to engage the stops. One of the faces of the second stop is beveled so that it will throw the pawl out of position to allow the stop to pass. The spring 21 then operates and the pawl is thrown back into position to engage the rear side of the pawl 18. The trolley arm is thus automatically locked in its lower position.

The lug 12 upon which the cable wraps is preferably so formed in relation to the pivotal axis of the trolley arm that the force transmitted to the end of the pole and tending to hold it against the trolley wire will be equal for all positions of the trolley arm. It may be desirable, however, in some cases to have this force vary with the position of the trolley arm and any desired variation can be secured by properly forming the lug. 12.

I prefer to use a steel cable for connecting the spring and the trolley arm but, if preferred, another flexible connection may be used, as, for instance, a chain. The rotatable mounting of the arm permits it to swing freely to engage the trolley wire as the position of the trolley wire relative to the track varies from place to place. The position of the trolley arm may also be completely reversed when it is desired to reverse the direction of motion of the locomotive. The inner sleeve, trolley arm and the spring connections are connected together to form a unitary structure which may readily be detached as a whole from the locomotive.

It will be seen that the movable parts, with the exception of the trolley arm itself, are below the top of the locomotive and are thus entirely protected from accident.

Another advantage of my construction is its compactness. In mine locomotives the vertical clearance space is generally not very great and it is therefore desirable to have the vertical length of the trolley support as short as possible. This will give more room for the moving parts of the locomotive and will also permit the trolley support to be removed more readily.

What I claim is—

1. A self-contained trolley arm and support, comprising a bearing sleeve adapted to be set into or removed from a socket on a car, an inner bushing fitting in the bearing sleeve, and adapted to rotate therein, a trolley arm mounted upon the inner bushing by a horizontal pivot, and having a curved groove lying in a vertical plane, a spring within the inner bushing and engaging at its upper end with the said bushing, and a flexible connecting means attached at its upper end to the trolley arm and adapted to engage the groove thereof and attached at its lower end to the spring so that the force of the spring will be exerted to throw the trolley arm into operative position, substantially as set forth.

2. A self-contained trolley arm and support comprising a bearing sleeve adapted to be set into or removed from a socket on a car, an inner bushing fitting in the bearing sleeve and adapted to rotate therein, a trolley arm mounted upon the inner bushing by a horizontal pivot and having a curved groove lying in a vertical plane, a spring within the inner bushing and engaging at its upper end with the upper part of the said inner bushing, and a flexible connecting means attached at its upper end to the trolley arm and adapted to engage the groove thereof, and attached at its lower end to the spring so that the force of the spring will be exerted to throw the trolley arm into operative position, substantially as set forth.

3. A self-contained trolley arm and support comprising a bearing sleeve adapted to be set into or removed from a socket on a car, an inner bushing adapted to rotate in the bearing sleeve, a coiled spring within the bushing and engaging at its upper end with the bushing, a flexible connecting means extending through the spring and attached at its lower end to the spring, a trolley arm pivotally mounted on the inner bushing and having a curved surface, the upper end of the connecting means being connected to the trolley arm so that it will engage the curved surface of the trolley arm, substantially as set forth.

4. A self-contained trolley arm and support comprising a bearing sleeve adapted to be set into or removed from a socket on a car, an inner bushing adapted to rotate in the bearing sleeve, a spring mounted on the inner bushing, a flexible member attached to the spring and adapted to transmit its force, a trolley arm pivotally mounted upon the inner bushing, and having a curved surface engaged by the flexible member, the curved surface being so formed that the perpendicular distance from the pivotal axis of the trolley arm to the flexible member will vary in accordance with the position of the trolley arm, substantially as set forth.

5. The combination of a railway car having formed in its frame a socket that extends below the top of the car, a self-contained trolley arm and support, the support being arranged to be inserted into the socket and to turn freely therein, a spring in the socket engaging the support, and a flexible connection between the said trolley arm and the said spring, substantially as set forth.

6. In combination with a railway car in which is formed a cavity extending below the top thereof, a socket-like trolley support fitting into the said cavity so as to be freely removable therefrom, a trolley arm connected with the said socket-like support by a pivot or hinge joint, the trolley and its support being free to turn about a vertical axis, a flexible member attached at its upper end to the trolley arm and adapted to wrap and unwrap around a portion thereof as the trolley arm is moved, and a coiled spring with its upper end bearing against the socket-like support, and its lower end connected with the said flexible member, these parts constituting a self-contained trolley support adapted to be moved from and inserted into the said cavity in the car, substantially as set forth.

7. The combination with a railway car having a cavity extending downward below its top plane, of a base, means for mounting the base on the car for movement about a vertical axis extending through the cavity, a trolley arm pivotally mounted on the base at a point at one side of the vertical axis, the said arm having a cam-shaped surface, the active part of which is vertically above the central part of the cavity, a flexible member attached to the trolley arm and adapted to engage and wrap around the cam-shaped surface, and means located within the cavity and connected to and movable as a whole with the base for tensioning the flexible member to maintain an upward force at the outer end of the trolley arm, substantially as set forth.

8. The combination of a trolley arm, a support upon which the arm is pivotally mounted, a pivotally mounted pawl, a stop adapted to be engaged by the pawl to limit the movement of the arm in one direction and a second stop adapted to be engaged by the pawl to hold the trolley arm in its lower position, substantially as set forth.

9. The combination of a trolley arm, a support upon which the arm is pivotally mounted, a pawl pivotally mounted on the support, a lug attached to the arm and adapted to be engaged by the pawl to limit the motion of the arm in one direction, and a second lug also mounted on the trolley arm and adapted to be engaged by the pawl to hold the trolley arm in its lower position, substantially as set forth.

10. The combination of a trolley arm, a support upon which the arm is pivotally mounted, a pawl pivotally mounted on the support, a lug attached to the arm, and adapted to be engaged by the pawl to limit the motion of the arm in one direction, a second lug also attached to the arm and adapted to be engaged by the pawl to hold the arm in its lower position, and means whereby the pawl is automatically thrown into engagement with the lugs, substantially as set forth.

11. The combination of a trolley arm, a support upon which the arm is pivotally mounted, a pawl pivotally mounted on the support, the pivotal axis of the pawl lying at right angles to the pivotal axis of the arm, a lug attached to the arm and adapted to be engaged by the pawl to limit the motion of the arm in one direction, a second lug also attached to the arm and adapted to be engaged by the pawl to hold the arm in its lower position, the second lug having a beveled face adapted to engage the pawl and swing it out of normal position to permit the passage of the lug in one direction, and a spring adapted to normally hold the pawl in position to engage the lugs, substantially as set forth.

12. The combination of a trolley arm, a support upon which the arm is pivotally mounted, a movably mounted pawl, a stop adapted to be engaged by the pawl to limit the movement of the arm in one direction and a second stop adapted to be engaged by the pawl to hold the trolley arm in its lower position, substantially as set forth.

In testimony whereof I affix my signature, in presence of two witnesses.

DUDLEY T. FISHER.

Witnesses:
   J. G. CHANDLER,
   ARTHUR G. SKEELS.

---

Copies of this patent may be obtained for five cents each, by addressing the "Commissioner of Patents, Washington, D. C."